United States Patent [19]

Yoshida et al.

[11] E Patent Number: Re. 31,637

[45] Reissued Date of Patent: Jul. 31, 1984

[54] COMBINATION MICROWAVE AND GAS OVEN

[75] Inventors: Nagatoshi Yoshida, Moriguchi; Yoshihito Taga, Tottori, both of Japan

[73] Assignee: Sanyo Electric Co., Ltd., Osaka, Japan

[21] Appl. No.: 416,510

[22] Filed: Sep. 10, 1982

Related U.S. Patent Documents

Reissue of:

[64] Patent No.: 4,211,909
Issued: Jul. 8, 1980
Appl. No.: 906,245
Filed: May 15, 1978

[30] Foreign Application Priority Data

May 13, 1977 [JP] Japan ..... 52-56213

[51] Int. Cl.[3] ..... H05B 6/64

[52] U.S. Cl. ..... 219/10.55 R; 219/10.55 F; 126/39 C; 126/273 R

[58] Field of Search ..... 219/10.55 R, 10.55 B, 219/10.55 F, 10.55 M, 10.55 D, 400; 126/273 R, 275 E, 39, 39 BA, 39 C

[56] References Cited

U.S. PATENT DOCUMENTS

| | | | |
|---|---|---|---|
| 2,910,566 | 10/1959 | Smith | 219/10.55 R |
| 3,470,942 | 10/1969 | Fukada et al. | 219/10.55 B |
| 3,789,178 | 1/1974 | Harhen | 219/10.55 R |
| 3,829,649 | 8/1974 | Igarashi | 219/10.55 B |
| 4,096,369 | 6/1978 | Tanaka et al. | 219/10.55 R |
| 4,097,709 | 6/1978 | Bachtold et al. | 219/10.55 R |

*Primary Examiner*—B. A. Reynolds
*Assistant Examiner*—Philip H. Leung
*Attorney, Agent, or Firm*—Armstrong, Nikaido, Marmelstein & Kubovcik

[57] ABSTRACT

A combination microwave and gas oven, in which an object to be heated is heat-treated by microwave energy and air heated by a gas burner inside a combustion chamber and forced to be circulated by a fan. A microwave introducing port to the heating cavity is covered with a heat insulating member provided with a film which can reflect the radiant energy transferred to the direction of the microwave introducing port. To prevent the leakage of microwave from the heating cavity especially related to a shaft of the fan which is connected to a driving motor located outside the heating cavity, a choke cavity for terminating leaked microwave from said cavity is provided.

18 Claims, 8 Drawing Figures

COMBINATION MICROWAVE AND GAS OVEN

Matter enclosed in heavy brackets [ ] appears in the original patent but forms no part of this reissue specification; matter printed in italics indicates the additions made by reissue.

BACKGROUND OF THE INVENTION

This invention relates to an oven and more particularly, to a novel combination of microwave and gas oven for heat-treating foodstuff based on characteristics of high frequency heating through a source of microwave energy and heating by physical burning through a gas burner, with foodstuff being exposed in the atmosphere of said combined energy within an oven.

One of the difficulties in cooking encountered by using a conventional electronic oven, has been the inability of such microwave energy to scorch or brown surfaces of foodstuffs to such an extent as will stimulate appetite and, thus the oven of this type is mainly used for limited cooking purposes, such as reheating or defreezing of foodstuffs.

On the contrary to the heating characteristics of the electronic oven mentioned above, a gas oven is a handy cooking device especially for browning surfaces of foodstuffs due to its fundamental heating system while being not so effective for defreezing or reheating of foodstuffs, and thus, this type of cooking device is also available only for limited range of cooking as mentioned above. The combination microwave and gas oven has already been proposed, for example, by U.S. Pat. No. 3,789,178, wherein the combination microwave and gas oven is provided with a divider shelf preferably horizontally disposed, thereby dividing the oven cavity into a cooking section and a section containing the gas heating apparatus. The outer boundary of the shelf forms a low impedance choke directly coupled to the cooking section with a perimetrical shelf holder, thereby terminating microwave energy fed to the cooking section and preventing degradation of the gas heating apparatus provided therebelow.

The known combination microwave and gas oven as described above has such a disadvantage that energy supplying source for the oven portion such as a gas burner or the like must be still provided with relatively large capacity for quick heat-treatment of an object to be heated.

However, if the heat is excessively added to the combination of microwave and gas oven mentioned above, there appears a tendency to overheat the source of the microwave supplies such as a magnetron. Furthermore, even the combination of microwave and gas oven which can transmit heat under the forced convection condition therein, has not been applicable for browning surfaces of foodstuffs within relatively short period of cooking time due to its lack of the desired radiant heat.

Furthermore, when a fan is provided for circulating the heat generated by a heater such as the electric heater in the heating cavity of the oven mentioned above, there is a problem of leakage of microwave resulting from the construction of a shaft of the fan for circulation, wherein since the shaft connected with the fan located inside the heating cavity will pass through the boundary of the heating cavity and come out to be connected with the driving motor, a leakage of microwave cannot be avoided and naturally occurs in the vicinity of a through hole for setting said shaft.

Accordingly, an essential object of the present invention is to provide a combination microwave and gas oven which will combine both characteristics of a microwave oven and that of a gas oven, whereby disadvantages in each of the cooking method is compensated for each other, and which can treat foodstuffs in many ways as far as the range of browning, defreezing and reheating.

Another important object of the present invention is to provide a combination microwave and gas oven of the above described type, which is provided with a fan for effectively circulating the heat in a heating cavity, and also with a proper protectional member against over-heating of a source of microwave energy.

A further object of the present invention is to provide a combination microwave and gas oven of the above described type, wherein a choking system is provided for terminating leakage of microwave energy especially with respect to a shaft of a circulation fan and its connectors.

A still further object of the present invention is to provide a combination microwave and gas oven of the above described type, which is simple in construction and efficient in operation, and can be manufactured at low cost.

SUMMARY OF THE INVENTION

In accomplishing these and other objects according to one preferred embodiment of the present invention, there is provided a combination microwave and gas oven which comprises an outer casing, a heating cavity defined by walls within the outer casing, a high frequency oscillator for supplying microwave energy into the heating cavity, a combustion chamber independently positioned from said heating cavity, a door means adapted to selectively open and close an access opening defined at one side of the heating cavity, a gas burner positioned inside the combustion chamber and supplying heated air to the heating cavity, a circulation fan accommodated inside an independent room connected with the heating cavity and circulating the heated air inside the heating cavity, a microwave terminating member for terminating leakage of microwave from the heating cavity through the fan accommodating room, a microwave insulated exhaust passage for the heated air positioned between the heating cavity and the outer casing and an insulating member of leakage of microwave and heated air interposed between the door and the heating cavity in order to avoid leakage of microwave from an inside of the heating cavity to an outside of the heating cavity.

The microwave terminating member, which is interposed between the fan accommodating room and the motor for driving the circulation fan, comprises a fan having a back board for cooling the motor positioned at the backward end of the shaft of the circulation fan, said fan for cooling having a diameter which is more than a half length of a basic wavelength generated by the high frequency oscillator, an outer box having an open side on a facing side to the fan for cooling being securely fixed to a rear side of the heating cavity on the same shaft, a diameter of said outer box being approximately same to the diameter of the fan for cooling, and a silk-hat shaped member fixed to an inner surface of the outer box at its top surface, said silk-hat shaped member having a slight less diameter of the diameter of the outer box and interposed between the fan for cooling and the outer box, whereby a choke cavity for terminating leaked microwave from the heating cavity is being assembled. The substantial vertical length of the central portion of the entrance portion of the choke cavity mentioned above is equivalent to the one-fourth of the basic wavelength of the microwave generated. Furthermore, the choke cavity provided in a combination microwave and gas oven of the present invention is characterized in that the choke cavity is interposed between the fan for cooling mounted outside of the heating cavity and the heating cavity, and thereby, the choke cavity is independently located outside of the heating cavity. By the arrangement of the choke cavity mentioned above, not only the utilization of the fan for cooling to the portion of the choke cavity will lead the low cost of manufacturing the oven, but also the contamination of the choke cavity is prevented due to its location separated from the heating cavity.

Furthermore, bounding member between the heating cavity and the microwave introducing port is provided with a layer made of silicone, and this layer freely mounted and demounted in position by means of rails laid thereunder. The one side of silicone layer, which is facing to the heating cavity is coated by a film made of magnesium oxide or barium sulfide, the nature of which can transmit the microwave energy, however can reflect the radiant energy such as heat due to an infrared ray. The both sides of silicone layer may be coated by said films. Furthermore, the coating dimension of the film may be a partial surface or a whole surface. A partial coating of the film can be utilized for the modification of the temperature distribution inside the heating cavity. The radiant heat of the heated air introduced into the heating cavity may heat and brown the object inside the heating cavity through the radiation reflecting film positioned on the boundary mentioned above. In these situation, the radiant heat is avoided to transmit to the above wave guide and be enclosed inside the heating cavity. Therefore, by the radiant energy reflecting construction of the present invention, not only the overheating of the high frequency oscillator is prevented, but also the effective utilization of the energy generated can be affected.

Still furthermore, especially for preventing the leakage of the microwave from the heating cavity, the microwave insulating member such as the punched board is provided at a connecting boundary between the heating cavity and the combustion chamber as well as a connecting boundary between the exhaust passage and the heating cavity, and a connecting boundary between the exhaust passage and the microwave introduction port respectively.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
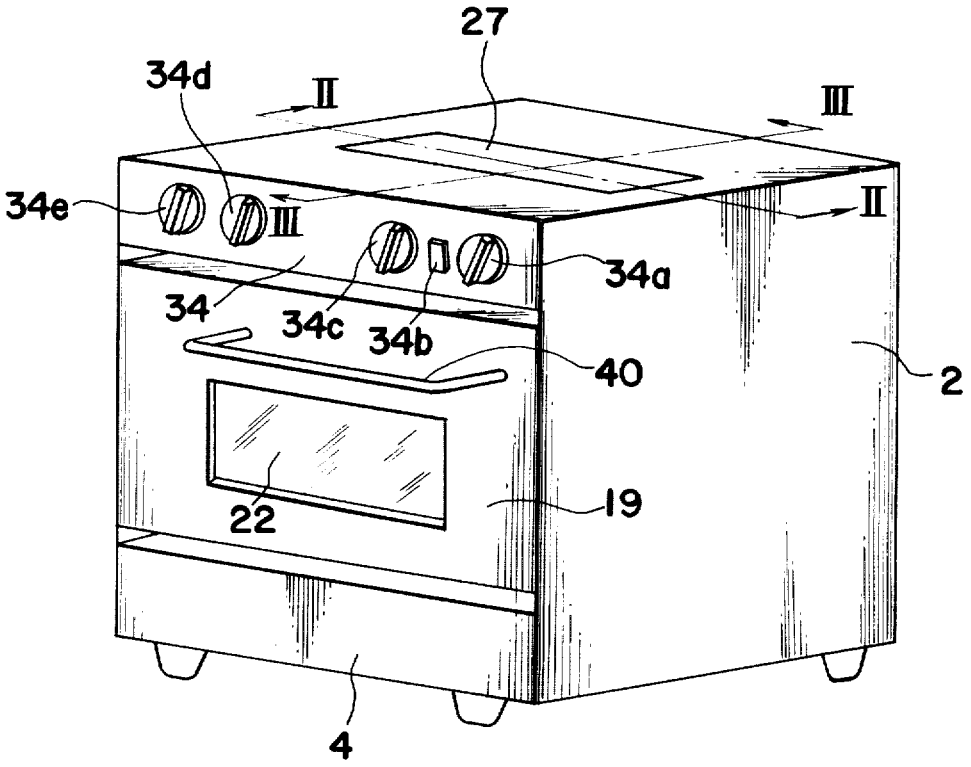
FIG. 1 is a perspective view of a combination microwave and gas oven of the present invention.

Referring now to FIGS. 1 through 4, there is shown a combination microwave and gas oven according to the present invention which heat-treats objects or food material to be heated based on the principle of high frequency heating and combustion heating by utilizing a microwave oven and a gas burner therein. The oven of FIG. 1 includes an outer casing 2 of cubical box-like shape open at the front side thereof, to which a door 19 is provided. The door 19 is provided with a handle 40 adjacent to one edge thereof remote from a hinge 21 through which the door 19 is supported, at the lower edge thereof, to the lower front edge of the casing 2 in a position corresponding to the access opening 20 for pivotal upward and downward movements about the hinge 21 so as to selectively open and close the opening. The door 19 has a rectangular observation window 22 formed therein to allow the object placed in a heated cavity 1 to be observed therethrough and also for preventing the high frequency energy from leaking out of the heating cavity 1 during operation of the said oven of the present invention.

The outer casing 2 forms a double wall structure together with inner walls which are defining the heating cavity 1.

The outer casing 2 further includes an outside front wall portion immediately above the opening. On the front wall portion as shown in FIG. 1, there is mounted a control panel 34 for controlling functioning of a high frequency oscillator and the like mentioned above, which panel carries thereon from right to left a gas operation knob 34a which includes the operational function of the ignition, a start button 34b for initiating the high frequency oscillator, a temperature controlling knob 34c for controlling the inside temperature of the heating cavity 1 during gas combustion operation, a timer operating knob 34d for heating by a high frequency oscillator, and a timer operating knob 34e for heating by a gas combustion burner 5. On the upper side surface of the oven, there is provided an exhaust opening 27 of rectangular configuration for exhausting heated air in the heating cavity 1 due to combustion out of the outer casing 2, while a combustion chamber 4 is independently provided as an understructure of the heating cavity 1 inside the casing 2 as shown in FIGS. 2 and 3.

Figure 2:
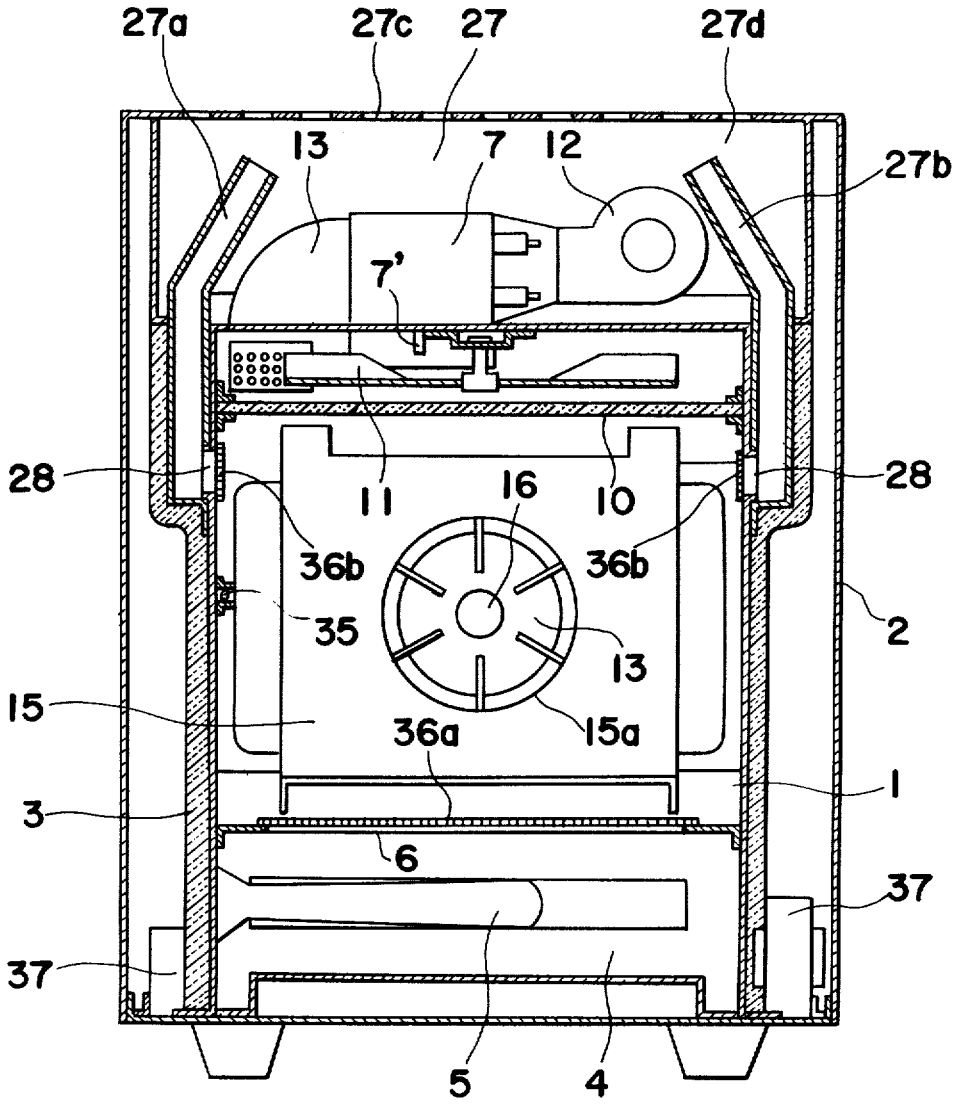
FIG. 2 is a cross section taken along the line II—II of FIG. 1.
Figure 3:
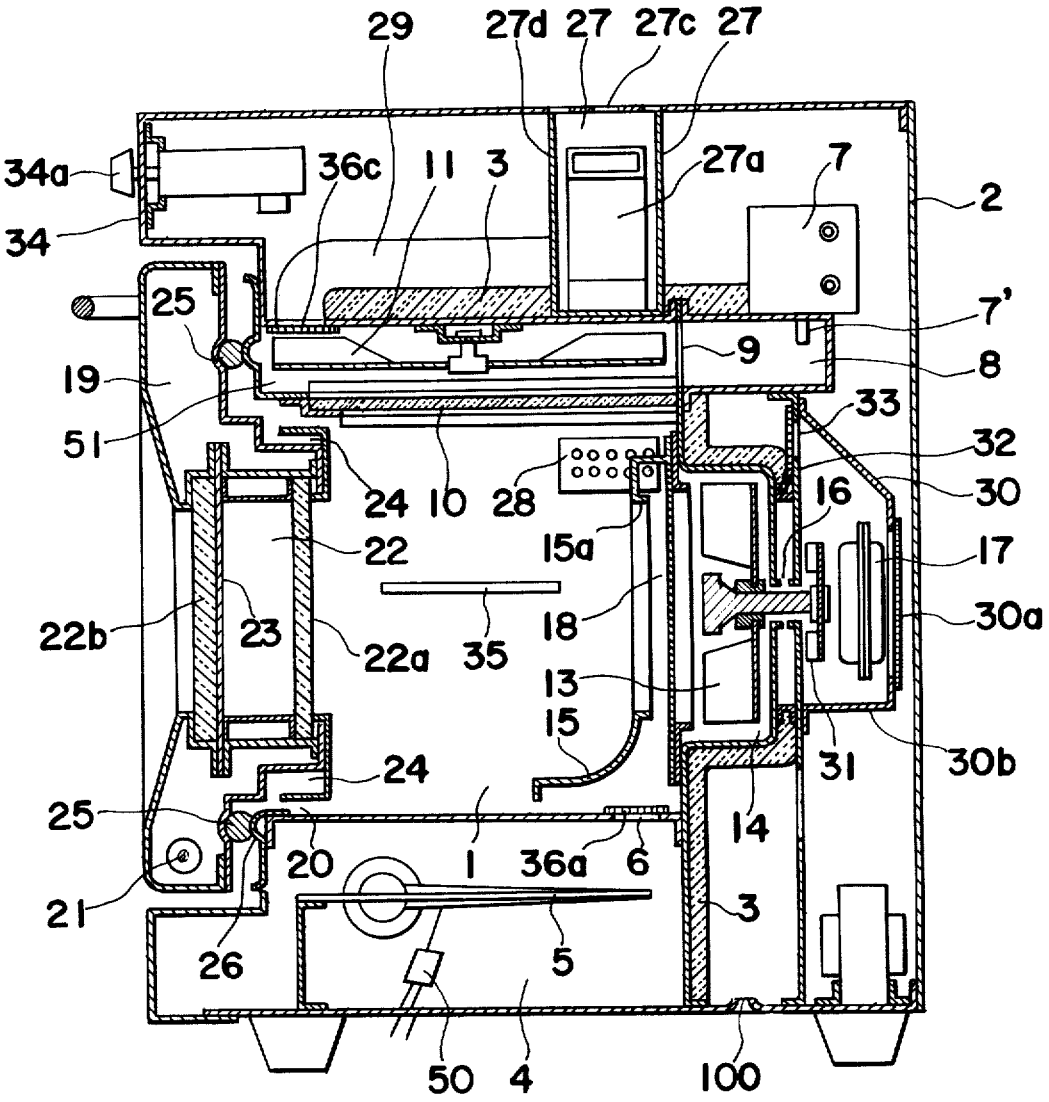
FIG. 3 is a cross section taken along the line III—III of FIG. 1.

Referring to FIGS. 2 and 3, the heating cavity 1 is lined in its inner surfaces, with thin enamel layer, while its outer surface is provided with a layer 3 of heating insulating material, such as glass-wool or the like. The understructure of the heating cavity 1 is the combustion chamber 4 for this embodiment as mentioned above, in which a gas burner 5 is located. The gas burner 5 is ignited by a gas ignition plug 5. The air heated by gas combustion with a gas burner 5 is introduced into the heating cavity 1 through a connecting opening 6 between the combustion chamber 4 and the heating cavity 1, while in the understructure partial wall of the heating cavity 1 is inevitably heated in this construction.

An antenna 7' of a high frequency oscillator 7 such as a magnetron for generating microwave energy is protruded into a wave guide 8, through which microwave is transmitted into a microwave introducing port 9 via a microwave supplying port 51 and into the heating cavity 1.

A cover 10 made of heat insulating and microwave transmitting material, which protects a source of microwave oscillator 7 from overheating by the heat transferred from the port 9 through the wave guide 8 is provided. A microwave mode averaging device or a stirrer fan 11 for making the microwave distribution uniform within the heating cavity 1 is rotatably mounted on the upper portion of the heating cavity 1 for rotation by the air flow caused by a blower 12 which has already been utilized for cooling the high frequency oscillator 7 and guided through the microwave guide 8 as shown in FIG. 2.

The outer casing is provided with a sucking portion 100 thereon to draw air into the blower 12. The air drawn through the sucking portion 100 flows towards the cooling blower 12. On its way to the blower 12, the air contacts the heat insulating layers 3, which surround the heating cvity 1, to cool the heat insulating layers 3. Afterwards, the air is arranged to pass through an insulating member 30 to cool the motor therewith.

A circulation fan 13 for circulating the heated air is positioned in the rear portion of the heating cavity 1 and rotatably housed in a fan accommodating room or a housing 14, which is communicated with the heating cavity 1, for drawing in the air through a central opening 15a of a flow rectifying board or a baffle plate 15 interposed between the fan accommodating room 14 and the heating cavity 1, and discharging it along the both substantially vertical sides and the underside of the flow rectifying board 15 in order to effectively circulate the heated air inside the heating cavity 1 and thereby to prevent uneven heat distribution as well as to rapidly raise the temperature in the heating cavity 1.

A shaft 16 of the circulation fan 13 mentioned above is connected to the shaft of a motor 17 disposed at the rear of the accommodating room 14, and thus said fan 13 is driven by the motor 17 at high speed.

To cover the communicating portion between the fan accommodating room 14 and the heating cavity 1, there is provided a plate 18 with fine pores which allows the heated air due to combustion to pass therethrough, but prevents the high frequency energy from entering the fan accommodating room or the housing 14 for shielding.

As mentioned earlier, the door 19 has the rectangular observation window 22 formed at the central portion thereof to allow the object placed in the heating cavity 1 to be observed therethrough and also for preventing the high frequency energy from leakage out of the heating cavity 1 during operation of the combination microwave and gas oven of the present invention.

The observation window 22 includes a pair of glass plates 22a and 22b of double wall structure for observing inside of the heating cavity 1, at least one of which has its corresponding inner surface lined with a light transmitting electrically conductive layer 23 for shielding against high frequency energy.

In place of the layer 23 mentioned above, a punched board may be employed. Choking cavities 24 formed in the rear portion of the door 19 and adjacent to the rear glass 22a of said observation window 22, are arranged for absorbing the microwave energy leaking through a clearance between the front bounding portion of the heating cavity 1 and the door 19 in order to prevent the transmission of the microwave out of the oven from the safe point of view.

Furthermore, as shown in FIG. 3, a medium or seal 25 formed by metallic fiber, which is attached to the door 19 at the further remote peripheral position from the choking cavity 24 mentioned above is arranged to contact a projection 26 which is provided on the inward corner of the cavity opening so that the microwave energy which has not been perfectly prevented by the choking cavity 24 mentioned above can be prevented thereby, with simultaneous iterception of leakage of air heated, when the door 19 is closed for operation.

Figure 4:
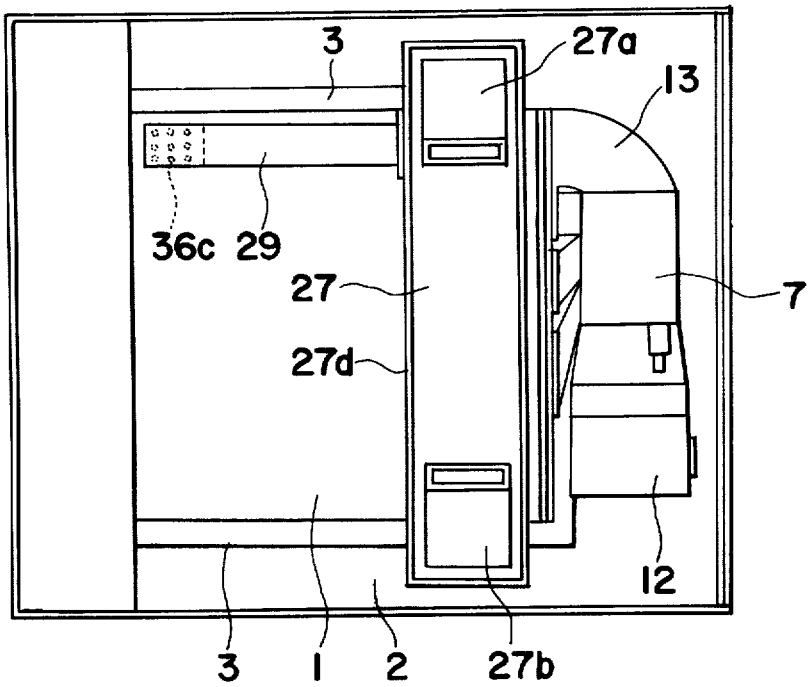
FIG. 4 is a top plan view of the combination microwave and gas oven of the present invention with upper portion of an outer casing removed for clarity.

As shown in FIGS. 2 through 4, there is provided an exhaust passage 27 for discharging the hot air within the heating cavity 1 which comprises a pair of exhaust ports 28 located at upper portion of the heating cavity 1, a pair of exhaust pipes 27a and 27b communicated with the exhaust ports 28 mentioned above, and a space 27d to collect the exhaust air from the pair of said exhaust pipes for communicating the upper openings of the pipes 27a and 27b with outside atmosphere as is most clearly seen in FIG. 2. The heated air to be exhausted within the space 27d is driven out of the apparatus through an opening 27c located at the upper side face of the casing 2. A duct 29 for exhausting the air flow, which has already been utilized both for cooling the high frequency oscillator and for rotating the microwave mode averaging device 11, is communicated with the exhaust space 27d shown in FIG. 4. An insulating member 30 is provided to cover the backward periphery of the motor 17 as shown in FIG. 3, whereby the microwave happened to enter the following accommodating room 14 can be prevented from further leaking through the shaft 16 of the motor 17, which will function as an antenna in such a case. The insulating member 30 is composed of a punched board 30a and a metallic board 30b.

There is further provided a cooling fan 31 in front of the motor 17 as shown in FIG. 3 for cooling through forced convection, the motor 17, which fan 31 suctions the air through the punched board 30a of the insulating member 30 and exhaust it through a small opening 33 passing through a supporting member 32 which supports the motor 17.

A thermosensor 35 is provided at the central position of the heating cavity 1 for detecting changes of temperatures in the heating cavity 1 for maintaining a predetermined temperatures during operation through the operation of the knob 34c shown in FIG. 1.

The punched boards 36a, 36b and 36c for terminating the leakage of microwave energy from the heating cavity 1 are provided at the communicating portion between the heating cavity 1 and the combustion chamber 4 as well as the communicating portion between the exhaust passages 27a and 27b and the heating cavity 1 which is specifically shown in FIG. 2, and a communicating portion between the another exhaust passage 10 and the microwave introducing port 51 respectively.

An electric port 37 of the high frequency oscillator 7 is located at the lowest portion of the apparatus as shown in FIG. 2.

By the arrangement as described in the foregoing, the combination microwave and gas oven of the present invention makes it possible to heat and form browning on the surfaces of cooking objects simultaneously through combination of advantages in microwave heating and gas combustion heating, which has not been otherwise possible by single heating apparatus such as the gas oven, microwave oven or a microwave oven with browning arrangement or the like.

Although simultaneous heating and browning of cooking objects in a quick way may be thought of through combination of the microwave oven and electric heater based upon the microwave heating and the electric heating, such combination has not been proper for domestic use even if devised, due to limitation of domestic electric supplies.

Furthermore, in the oven of the present invention, since the gas burner is independently accommodated in its specific burning chamber separated from the heating cavity, not only the broad space is available for the heating cavity, but also the microwave leakage through the gas burner portion which functions as an antenna is advantageously prevented. Since the heat insulating cover is provided at the microwave introducing port of the heating cavity, the high frequency oscillator is protected from overheating which might otherwise take place by the heated air transferred through the wave guide and the like.

Moreover, the heat insulating layer provided to line the inner wall of the heating cavity is quite effective for preventing occurrence of overheating of the outer casing as well as the parts of the high frequency oscillator.

Figure 5:
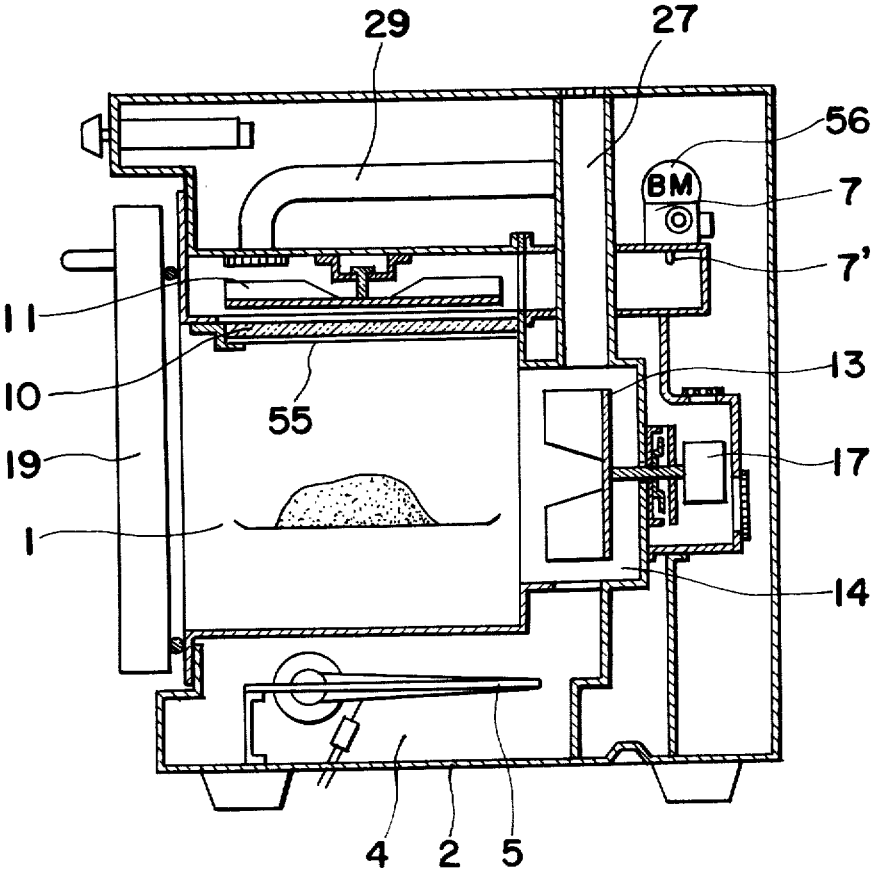
FIG. 5 is a cross sectional view of a modified embodiment of the present invention.

Referring to FIG. 5 there is shown a modification of the oven of FIGS. 1 to 4. In this modification, it is so arranged that part of heated air can be directly bypassed to the exhaust opening 27, and furthermore, the bounding board 10 disposed between the heating cavity 1 and the microwave introducing port 51 is provided with a heat insulating layer made of silicone, and this layer is mounted for moving back and forth with respect to the heating cavity 1 by means of rail or the like laid thereunder.

Figure 6:
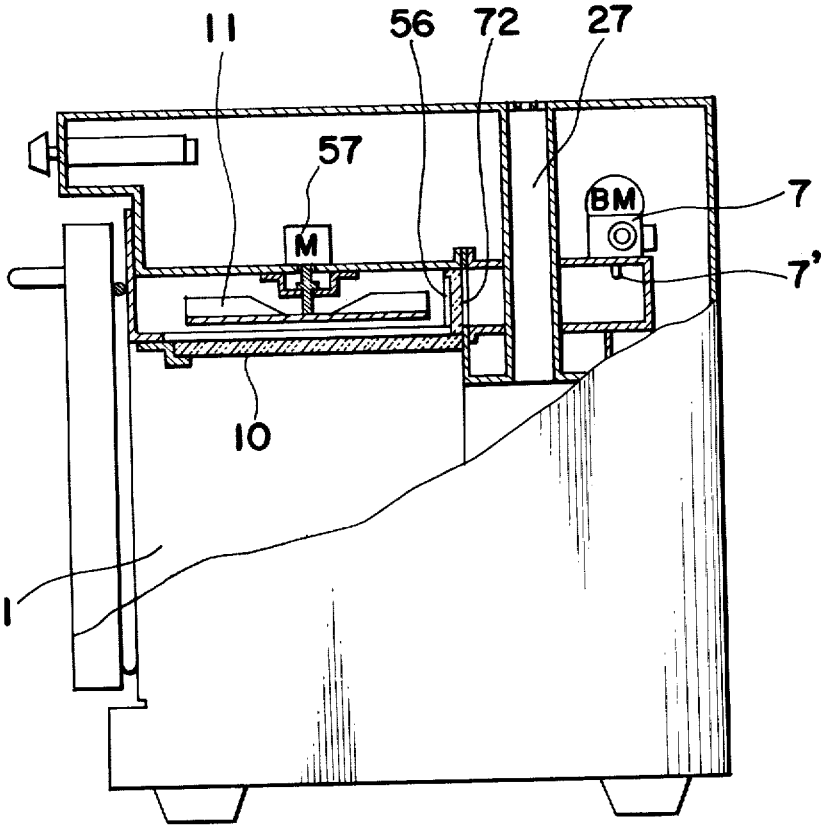
FIG. 6 is a partial cross sectional view of a modified embodiment of the present invention.

The one side of silicone layer, which is facing the heating cavity 1 is coated with a film 55 made of magnesium oxide or barium sulfide, having characteristics to transmit the microwave, but reflect the radiant energy such as the heat due to infrared rays. Both sides of the silicone layer may be coated with said film. Furthermore, the coating of the film 55 may be applied onto a partial surface or a whole surface. A partial coating of the film is effective for correction of uneven temperature distribution within the heating cavity 1. Air flow for cooling the high frequency oscillator is circulated by a blower 56, then flows through the wave guide 8 to rotate the microwave mode averaging device or the stirrer fan 11. The device may be driven by the motor 57 if necessary as shown in FIG. 6. Thereafter, the cooling air is flown out of the apparatus through the exhaust opening 27. As mentioned in the foregoing, the air heated by combustion of the gas burner 5 is introduced into the heating cavity 1 from the combustion chamber 4 through entraining motion of the circulating flow resulting from the sucking effects of the fan 13.

The radiant heat of the heated air introduced into the heating cavity 1 may heat or brown the object inside the heating cavity 1 when the radiant energy or heat thereof is reflected by the radiant reflecting film 55 positioned at the boundary mentioned above. In the above state, the radiant heat is prevented from being directed to the above wave guide 8 and enclosed inside the heating cavity 1.

Therefore, by the radiant heat reflecting construction of the present invention, not only the overheating of the high frequency oscillator is prevented, but also the effective utilization of the energy generated is guaranteed.

In another modified embodiment of the present invention shown in FIG. 6, the heat insulating body 72 provided with the film 56 having the characteristics as described is stuck to the exit side of the microwave transferring port 9 or the entrance side of microwave introducing port 51, thereby the film 56 reflects the radiant heat conversely introduced to the wave guide 8 through the microwave introducing port 51 in order to protect the high frequency oscillator 7 from overheating. Furthermore, the heat insulating body 72 prevents the further transmission of the heat transferred through convection from the heating cavity 1.

Figure 7:
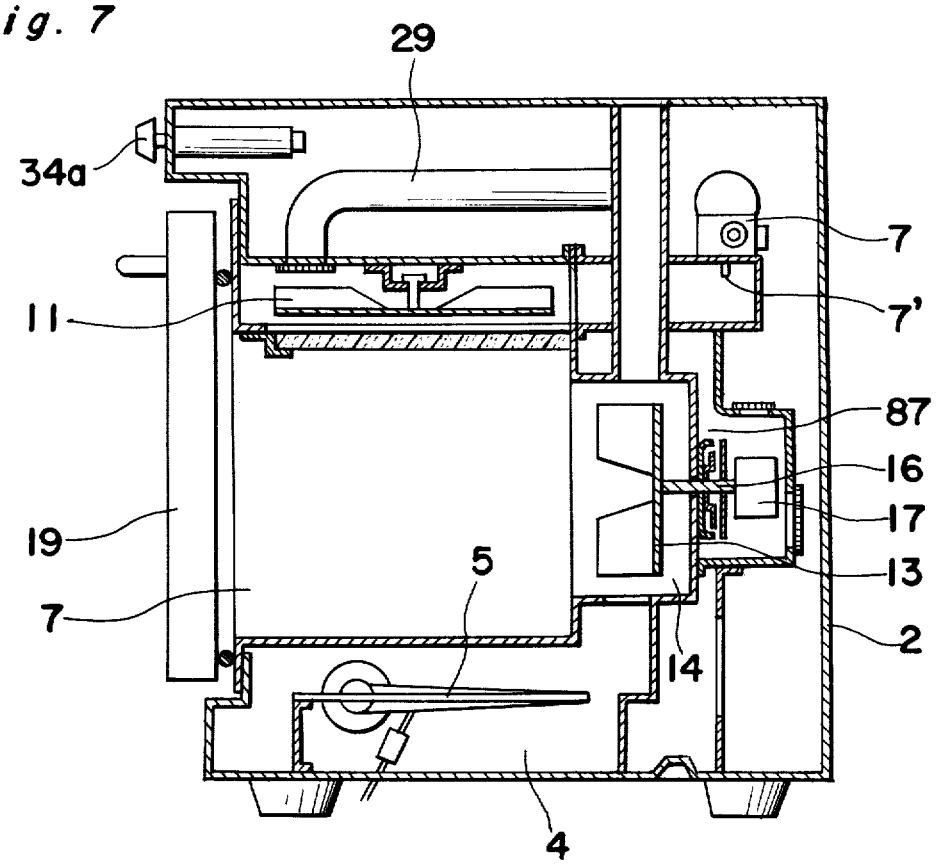
FIG. 7 is a cross sectional view of a modified embodiment of the present invention.
Figure 8:
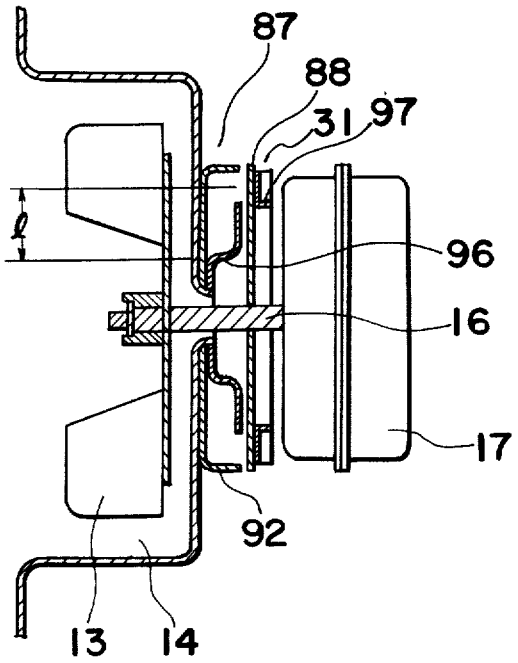
FIG. 8 is a partial view of the embodiment shown in FIG. 7 on an enlarged scale.

As shown in FIGS. 7 and 8, a microwave insulating member or a choke cavity 87 for terminating leaked microwave, which insulates leakage of microwave from the heating cavity 1 through the fan accommodating room or the housing 14, comprises a basic board 88 of a fan 31 for cooling the motor 17 positioned at the backward end of the shaft 16 of the circulation fan 13, an outer box 93 having an open side on a side facing the fan 31 securely fixed to the rear end of the heating cavity 1 on the same shaft 16, and a silk-hat shaped member 96 stuck to the inner surface of the outer box 92 at its literal top surface. The fan 31 for cooling the motor 17 is inserted in the shaft 16, while closely positioning to one silk-hat shaped member.

The fan 31 with blades 97 has a diameter which is more than a half length of a basic wavelength $\lambda$ generated by the high frequency oscillator 7. The diameter of the box 92 is approximately same to the diameter of the fan 31. The silk-hat shaped member 96 has a diameter slightly smaller than the diameter of the outer box 92 and interposed between the fan 31 and the outer box 92.

By the arrangement mentioned above, the choke cavity 87 for terminating leaked microwave from the heating cavity 1 is being formed, whereby the substantial vertical length of the central portion of the entrance portion of the cavity 87 mentioned above, which is denoted as 'l' in FIG. 8, is equivalent to the one-fourth of the basic wavelength of the microwave generated.

Furthermore, the choke cavity 87 provided in the present invention of a combination microwave and gas oven is characterized in that the choke cavity 87 is interposed between the fan 31 mounted outside of the heating cavity 1, and the heating cavity 1 and thereby, the choke cavity is independently located outside of the heating cavity 1.

By the arrangement as described above, not only the utilization of the fan 31 as a portion of the choke cavity will lead to the low cost in manufacturing the apparatus, but also the soiling of the choke cavity 1 is prevented owing to its location separated from the heating cavity 1.

The operational characteristics of the present invention are as follows.

(1) For heating by microwave

After having set the high frequency oscillator for desired time duration for a specific cooking object by the setting timer 34d and subsequently, putting on the start button 34b, the generation of microwave is initiated and microwave thus generated is transmitted to the heating cavity 1 through the wave guide 8.

Simultaneously, the air flow generated by the blower 12 as shown in FIG. 2 cools the source of the high frequency oscillator and then, is introduced into the microwave introducing port 51 to rotate the stirrer fan or the microwave mode averaging device 11.

Accordingly, the microwave introduced into the heating cavity 1 uniformly heats the heating object with microwave energy evenly distributed by means of the stirrer fan 11.

The air flow utilized for rotating the stirrer fan 11 is discharged out of the oven through the exhaust duct 29.

(2) For heating by gas combustion

At the initiation of the operation, the temperature of the heating cavity 1 is adjusted to the optimum level for cooking a specific heating object by the temperature controlling knob 34c and then, the gas combustion portion is ignited to initiate the combustion by turning around the gas operation knob 34a.

The flow of the heated air generated by the gas burner 5 mentioned above is introduced into the heating cavity 1 through the opening 6, and the simultaneous actuation of the circulation fan 13 of air rapidly causes the temperature in the heating cavity 1 to rise to the set level (the preheating process).

When the temperature of the heating cavity 1 is reached the set temperature, the heating objects to be heated are to be accommodated in position inside the heating cavity 1. The temperature in the heating cavity 1 is automatically kept around the set temperature by the thermosenser 35, which has been set in advance for the desired time duration by a timer operating knob for heating by the gas combustion burner 34e. The thermosenser 35 actuates the gas combustion, while repeating the on and off operation of ignition of the gas burner 5 in order to maintain the desired temperature for the desired duration. The exhaust gas after cooking is discharged from the opening 27c.

(3) For combination of heating by microwave and heating by gas combustion

Simultaneous utilization of the gas combustion and the microwave for cooking will reduce the cooking duration for specific objects, if the operational characteristics of each heating method are properly utilized and combined, whereby the delay in time preheating, which is specific in heating by gas combustion will be compensated by the microwave heating which almost has no time delay for heating.

For example, depending upon the nature of objects for heating and the specifically desired heating degree of the objects, the cooking may be initiated by the microwave heating and then replaced by the gas burner heating.

Furthermore, the cooking may be initiated by either one of the microwave heating operation of the gas combustion heating operation, and the subsequent heating may be effected simultaneously by two heating methods when necessary.

As is clear from the foregoing description, the combination microwave and gas oven of the present invention can serve to provide a variety of cookings, depending upon the nature of the cooking objects and the desired heating degree of the cooking objects, and thus, also serve for promoting the daily life from the point of view of cooking.

Although the present invention has been fully described by way of examples with reference to the attached drawings, it is to be noted that various changes and modifications are apparent to those skilled in the art. Therefore, unless otherwise such changes and modifications depart from the scope of the invention, they should be construed as included therein.

What is claimed is:

1. A combination microwave and gas oven which comprises:

an outer casing, a heating cavity defined by walls within said outer casing, means for supplying microwave energy into said heating cavity, a combustion chamber positioned adjacent to said heating cavity within said outer casing, a door means adapted to selectively open and close an opening defined at one side of said heating cavity, a gas burner positioned within said combustion chamber for supplying heated air to said heating cavity, a circulation fan positioned within a housing and communicating with said heating cavity for circulating said heated air inside said heating cavity, first microwave screen means, positioned within said outer casing on the side thereof opposite said door means for preventing the leakage of microwave energy from said heating cavity through said housing, an exhaust passage positioned between said heating cavity and said outer casing, for allowing said heated air to flow out of said outer casing, and seal means interposed between said door means and a periphery of said opening of said heating cavity for preventing the leakage of microwave energy and heated air from inside of said heating cavity to outside of said heating cavity through the space between said door means and the periphery of said opening.

2. A combination microwave and gas oven as claimed in claim 1, including a connecting through hole between said heating cavity and said combustion chamber and second microwave screen means positioned on said connecting through hole.

3. A combination microwave and gas oven as claimed in claim 1 and including a microwave introducing port, and a cover means for heat insulating and microwave transmitting, said cover means being positioned at said microwave introducing port to protect said means for supplying microwave energy from overheating.

4. A combination microwave and gas oven as claimed in claim 3, wherein said cover means comprises a medium for reflecting radiant energy transmitted from the inside of said heating cavity.

5. A combination microwave and gas oven as claimed in claim 4, wherein said medium is positioned to face an object to be heated.

6. A combination microwave and gas oven as claimed in claim 1, including exhaust duct means, exhaust tubes extending from said heating cavity and coupled to said duct means, and an air exhaust duct for cooling said means for supplying microwave energy coupled to said duct means.

7. A combination microwave and gas oven as claimed in claim 1, wherein seal means is securely attached to a peripheral corner of said door wherein said seal means is interposed by said door and a corner of the periphery of the opening of said heating cavity when said door is closed cavity when said door is closed.

8. A combination microwave and gas oven as claimed in claim 1, wherein each timer operating knob for operating said means supplying microwave energy and said gas burner independently operate said means supplying microwave energy and said gas burner.

9. A combination microwave and gas oven as claimed in claim 1, wherein said combustion chamber is located under said heating cavity.

10. A combination microwave and gas oven as claimed in claim 1, including exhaust ports at the upper portion of said heating cavity.

11. A combination microwave and gas oven as claimed in claim 1, including a microwave mode averaging means at a microwave introducing port located above said heating cavity.

12. A combination microwave and gas oven as claimed in claim 1, wherein said heating cavity is covered with heat insulating layers.

13. A combination microwave and gas oven as claimed in claim 1, including a flow rectifying member in front of said circulation fan for enhancing the circulated flow of heated air within said heating cavity.

14. A combination microwave and gas oven as claimed in claim 1, wherein said housing is provided by recessing the opposite side portion of said heating cavity, said housing having a microwave screening, porous board in front thereof.

15. A combination microwave and gas oven as claimed in claim 1, wherein said motor positioned outside said housing for driving said circulation fan is covered by a microwave insulating member at the rear end thereof.

16. A combination microwave and gas oven as claimed in claim 1, wherein said outer casing is provided with an inlet portion to draw air into a blower therein, said air introduced contacting with said heat insulating layers for cooling said heat insulating layers.

17. A combination microwave and gas oven as claimed in claim 16, wherein said air introduced is passed through the vicinity of said motor to cool said motor therewith on its way to said blower.

18. A combination microwave and gas oven as claimed in claim 1, wherein said first microwave screen means comprises a fan having a back board for cooling said motor positioned at the rear of the shaft of said circulation fan, said fan having a back board for cooling, said fan having a diameter which is more than a half length of a fundamental wavelength generated by said means for supplying microwave energy, an outer box having an open side on a side facing said fan, said outer box being securely fixed to the rear of said housing surrounding said shaft, the diameter of said box being approximately the same as said diameter of said fan, and a silk-hat shaped member fixed to an inner surface of said outer box at its top surface, said silk-hat shaped member having a smaller diameter than said diameter of said outer box, said silk-hat shaped member being interposed between said fan and said outer box, thereby forming a choke cavity for terminating leaked microwave energy from said heating cavity.

* * * * *

UNITED STATES PATENT AND TRADEMARK OFFICE

CERTIFICATE OF CORRECTION

PATENT NO. : Re. 31,637

DATED : July 31, 1984

INVENTOR(S) : NAGATOSHI YOSHIDA ET AL

It is certified that error appears in the above-identified patent and that said Letters Patent is hereby corrected as shown below:

On the cover page, Item [73], change "Sanyo Electric Co., Ltd., Osaka, Japan" to --- Sanyo Electric Co., Ltd., Osaka, Japan and Tottori Sanyo Electric Co., Ltd., Tottori, Japan ---.

Signed and Sealed this

*Eleventh* Day of *June 1985*

[SEAL]

*Attest:*

DONALD J. QUIGG

*Attesting Officer* *Acting Commissioner of Patents and Trademarks*